United States Patent Office 3,420,879
Patented Jan. 7, 1969

3,420,879
PURIFYING AROMATIC POLYCARBOXYLIC ACID
Delbert H. Meyer, Highland, Ind., assignor to Standard Oil Company, Chicago, Ill., a corporation of Indiana
No Drawing. Filed Dec. 6, 1965, Ser. No. 512,005
U.S. Cl. 260—525                                       5 Claims
Int. Cl. C07c 51/42

This invention relates to the purification of aromatic polycarboxylic acids, and more particularly concerns the preparation of polycarboxylic acid having a purity sufficient for direct esterification with diols to product super polyesters. The process of the present invention is applicable to purification of aromatic polycarboxylic acids, such as, for example, terephthalic, trimesic, isophthalic, naphthalene dicarboxylic, trimellitic, pyromellitic, etc. The process is described herein as applied to the purification of crude terephthalic acid to produce terephthalic acid of fiber-grade quality; however, this should not be deemed a limitation of the process.

High molecular weight polyesters of terephthalic acid with various diols find extensive use as synthetic polyester films and fibers. These super polyesters have heretofore been prepared from dimethylterephthalate, which is trans-esterified with the appropriate diol, such as ethylene glycol, and then polycondensed to form the super polyester. The reason for this type of preparation is that terephthalic acid cannot be conveniently subjected to conventional purification techniques. Polyester preparation via dimethylterephthalate has been considered an essential step by reason of the exceptionally high purity requirements imposed on the polyester. Color bodies and other impurities, which act as chain terminators in the polymerization reaction, must be reduced to very low concentrations in the purified acid in order to obtain polymer acceptable in appearance and molecular weight.

With the advent of improved processes for the manufacture of terephthalic acid, much attention has been directed to obtaining polyesters by direct esterification of terephthalic acid with the diol. This has manifest advantages of simplicity and economy as compared with the dimethylterephthalate route. However, there still remains difficulty in obtaining purified trephthalic acid by a simple, commercially feasible process. Unless the initial terephthalic acid is virtually completely free from extraneous contaminants, the polyester will have too low a melting point and will be of unsatisfactory color.

It is believed that terephthalic acid impurities are of two types. First, the compound 4-carboxybenzaldehyde, an intermediate formed when terephthalic acid is obtained from the oxidation of paraxylene or a similar dialkyl benzene, is known to be deleterious with respect to polyester quality. Second, unidentified color bodies, possibly of the benzil or fluoronone structure, are usually present as trace by-products of most terephthalic acid production processes, and yield off-color polyesters. Any method of purifying terephthalic acid must reduce or eliminate both the 4-carboxybenzaldehyde (4–CBA) and the other impurities such as color bodies.

Heretofore, carbon treatment of the sodium salt of terephthalic acid has been employed. Color bodies and the 4–CBA are absorbed by activated carbon from solutions made by dissolving the crude terephthalic acid in caustic. 4–CBA, which can be removed by this method, soon saturates the carbon and hence allows for very short carbon life. The carbon has much less capacity for 4–CBA than it has for the color bodies and the breakthrough of the 4–CBA is the factor which normally limits the useful life of the carbon.

It has now been discovered, according to the invention, that aromatic polycarboxylic acid of a purity suitable for direct esterification with diols to produce films and fibers may be obtained from impure polycarboxylic acid containing aldehydic aromatic acid and/or ketonic aromatic acid and other impurities by treating the water soluble salt of the crude acid with an alkali-metal borohydride. Water soluble salts of the polycarboxylic acid include sodium, potassium, ammonium and the like salts. Examples of alkali-metal borohydride are sodium borohydride, potassium borohydride, etc. Sodium borohydride is preferred. By this treatment a purified acid containing substantially less aldehyde and ketone results. This process significantly prolongs the carbon life, when carbon treatment is used as a final purification, thereby decreasing the necessity for frequent carbon changes as well as decreasing the cost of purification.

According to the present invention there is provided a process for purifying aromatic polycarboxylic acid produced by liquid phase catalytic oxidation of polyalkyl aromatic hydrocarbons to remove undesirable aldehydic aromatic acid, ketonic aromatic acid, mixtures thereof, and other impurities comprising the steps of forming an aqueous solution of a water soluble salt of said acid containing said impurities, adding alkali-metal borohydride to said solution, removing any color bodies remaining from said crude acid by carbon treatment of the borohydride treated solution, and recovering the purified terephthalic acid.

In the preferred embodiment of the present invention, the aqueous solution of water-soluble terephthalic acid salt is prepared by converting said acid to its sodium salt, such as, for example, by dissolving sodium hydroxide and terephthalic acid in water. It is desirable that any heavy metal also present as impurity in the aromatic acid be removed prior to borohydride treatment. This may readily be accomplished by filtration, decantation, and the like.

The alkali-metal borohydride is then added over a period of time sufficient to cause complete distribution of the borohydride. The reaction which ensues proceeds quite rapidly. It is desirable to provide a low temperature for this reaction to prevent hydrolysis of the borohydride. The temperature may be up to 100° C., but is advantageously less than 50° C., and preferably between 20 and 30° C. The terephthalic acid salt may then be carbon treated by means known to those skilled in the art, such as, for example, batch-treating or bed-treating. It is desirable to then acidify the solution to regenerate the terephthalic acid from its salt. This is accomplished at a pH of less than 5 to 6 but it is preferable to acidify to a pH of less than 2. Mineral acid has been found suitable for this purpose, as, for example, sulfuric acid, hydrochloric acid, etc. The purified terephthalic acid may then be recovered by any known means such as filtration, decantation and any other means for separating solids from liquids.

The mole ratio of alkali-metal borohydride to aldehydic and/or ketonic acid, e.g. 4–CBA content may be as low as 1 to 4. Because of the presence of reactive impurities other than aldehydic and ketonic acids, it is desirable to use one mole of borohydride per 2–3 moles of aldehydic and/or ketonic acid.

The following examples illustrate the present invention but should not be contrued as limiting the scope of the invention thereto:

EXAMPLES 1–8

An aqueous solution of terephthalic acid was prepared by dissolving 50 grams of sodium hydroxide and 100 grams of crude terephthalic acid (0.140% 4–CBA) in 2000 ml. of water. A disodium terephthalate solution of pH 11 was obtained containing undissolved metal hydroxides which were removed by filtration. The resulting solution was then divided into 8 parts (Samples 1–8). Six of the 8 samples were then treated with varying amounts of sodium borohydride and 2 samples, the blanks, were not treated with sodium borohydride.

Table I lists the amounts of sodium borohydride added to each of the six samples. 350 ml. of the sodium terephthalate solution was charged to a 500 ml. round bottom flask equipped with a magnetic stirrer at 26–28° C. for two hours. The solution was acidified to a pH of less than 2 with dilute hydrochloric acid and the terephthalic acid was separated by filtration. The filtered acid was washed by digesting with 250 ml. dilute hydrochloric acid at 70° C. for 15 minutes, filtered, and then digested with 250 ml. of distilled water. The product was dried overnight in a vacuum over at 110° C.

EXAMPLE 9

One 100 gram sample of terephthalic acid in aqueous solution prepared as above was treated in analogous manner in order to operate at a sufficiently low level of sodium borohydride.

TABLE I

| Sample | Removal of 4-CBA—crude terephthalic acid | | | | $NaBH^4$ | | Terephthalic acid recovered | | |
|---|---|---|---|---|---|---|---|---|---|
| | Wt. | 4-CBA Content | | | Wt. | Moles | Wt. | 4-CBA | |
| | | Wt. | Moles | Percent | | | | Percent | Percent Removed |
| 1 | 17.06 | 0.0239 | 0.00016 | 0.140 | 0 | 0 | 16.5 | 0.139 | 0.7 |
| 2 | 17.06 | 0.0239 | 0.00016 | 0.140 | 0.17 | 0.0046 | 16.7 | 0.001 | 99.3 |
| 3 | 17.06 | 0.0239 | 0.00016 | 0.140 | 0.050 | 0.00014 | 16.6 | 0.002 | 98.6 |
| 4 | 17.06 | 0.0239 | 0.00016 | 0.140 | 0.017 | 0.00046 | 16.8 | 0.002 | 98.6 |
| 5 | 17.06 | 0.0239 | 0.00016 | 0.140 | 0 | 0 | 16.7 | 0.132 | 5.5 |
| 6 | 17.06 | 0.0239 | 0.00016 | 0.140 | 0.012 | 0.00032 | 16.8 | 0.001 | 99.3 |
| 7 | 17.06 | 0.0239 | 0.00016 | 0.140 | 0.0080 | 0.00022 | 16.7 | 0.001 | 99.3 |
| 8 | 17.06 | 0.0239 | 0.00016 | 0.140 | 0.0040 | 0.00011 | 16.7 | 0.0014 | 99.0 |
| 9 | 100.00 | 0.1490 | 0.00093 | 0.149 | 0.0096 | 0.00026 | 99.0 | 0.044 | 68.6 |

Table I clearly indicates that the process of this invention is effective for removing upwards of 99% of the 4-CBA impurity. This is quite significant when viewed in light of the fact that the useful life of the carbon, in a carbon treatment purification, is limited by the capacity of carbon to absorb 4-CBA.

As a further demonstration of the effectiveness of this invention, with specific reference to the increase in carbon life, the following example is given.

EXAMPLE 10

A solution was prepared by dissolving 100 grams of sodium hydroxide and 200 grams of crude terephthalic acid (0.117% 4-CBA) in 4,000 milliliters of water. The solution was filtered to remove flocculent metal hydroxide. A total of 4,110 milliliters of solution was obtained. Sodium borohydride (0.04 gram) was added to 1,540 milliliters of this solution and stirred for 2 hours. The pH was greater than 11. The pH was then adjusted to 6.5 to 7 by addition of purified terephthalic acid to the solution. The solution was divided into 3 equal parts and treated with carbon by shaking in a quart bottle for 18 hours. The carbon levels were 0.5 gram, 1.25 grams and 2.5 grams.

Three other equal samples were run without borohydride but with the same levels of carbon. The product was filtered to remove the carbon and then acidified and washed as follows:

Each filtrate was added dropwise to 1,000 milliliters of distilled water which had 28 milliliters of concentrated hydrochloric acid added to it and had been preheated to 75° C. The final pH was less than 2. The slurry was filtered and the filter cake washed 3 times by slurrying with 250 milliliters of distilled water at near boiling temperature. The final product was dried overnight at 110° C.

The samples of Example 10 were evaluated by use of the adsorption isotherm technique. The theoretical amount of terephthalic acid which may be purified by a given amount of carbon in a column is determined by applying a derived form of the Freundlick equation, which states that the impurity concentration on carbon at equilibrium ($C_c$), and the impurity level on terephthalic acid at equilibrium ($C_s$) will plot as a straight line on log-log paper.

The Freundlick equation is:

(1) $$C_c = KC_s^n$$

wherein K, the intercept and n, the slope of the equilibrium curve plotted on log-log paper, are both constants. This equation does not give the maximum life of the carbon, but carbon life may be determined from it because in a carbon filter column, if the flow of terephthalic acid is very slow or the carbon bed in the column is very long, the carbon will be in equilibrium with the feed when it is exhausted.

Therefore, if
$c$ = amount of carbon and
$s$ = amount of terephthalic acid passed when the carbon is all used up, then, (2) $$CC_c = SC_s$$

or (3) $$S/C = C_c/C_s$$

(the objective is to ultimately determine the value of S/C, i.e. the pounds of terephthalic acid per pound of carbon at equilibrium)

From Equation 1, 3 becomes (4) $$S/C = KC_s^n/C_s$$

or (5) $$S/C = KC_s^{n-1}$$

The data obtained and evaluated in accordance with the above procedure is summarized below:

TABLE II.—ADSORPTION DATA

| Sample | $C_s$ | $C_c$ | n | k | Carbon life, s/c |
|---|---|---|---|---|---|
| Sample of Ex. 10, not treated with sodium borohydride ($C_s$ and $C_c$ with respect to 4—CBA content). | 0.730 0.0450 0.0244 0.0026 | 10.0 2.75 1.51 0.974 | 0.571 | 22 | 82 |
| Sample of Ex. 10, treated with sodium borohydride ($C_s$ and $C_c$ with respect to optical density). | 0.203 0.042 0.052 0.040 | 64 28.8 5.6 2.9 | 1.85 | 1,320 | 586 |

For the samples which were not treated with sodium borohydride, the useful carbon life was limited to 82 pounds terephthalic acid per pound carbon. The samples which were treated with sodium borohydride show that the useful carbon life could be extended to 586 pounds terephthalic acid per pound carbon.

Optical densities of terephthalic acid were obtained by dissolving 1 gram of the acid in 25 ml. of dilute ammonium hydroxide solution and measured at a wavelength of 340 mμ in a spectrophotometer. The optical density is an arbitrary figure based on 0.00 for dilute ammonia alone.

Table III lists the optical density of the sample of terephthalic acid of Example 10, at various stages of purification. The following table shows that sodium borohydride treatment alone improves the optical density somewhat and that said borohydride treatment with carbon treatment provides excellent purification at a substantial savings of carbon.

TABLE III

| Sample: | Optical density |
|---|---|
| Crude terephthalic acid of Ex. 10 | 0.386 |
| Sodium borohydride treated sample of Ex. 10 prior to carbon treatment | 0.330 |
| Sodium borohydride treated sample of Ex. 10 after carbon treatment | 0.000 |

The purified samples obtained above clearly indicate that fiber-grade terephthalic acid may be obtained substantially more conveniently (because of the decreased frequency of change of carbon) and at a significant saving in cost.

What is claimed is:

1. A method of purifying crude aromatic polycarboxylic acid having impurity selected from the group consisting of aldehydic aromatic acids, ketonic aromatic acids, and mixtures thereof, which comprises the steps of forming an aqueous solution of said crude acid, treating said aqueous solution with at least one mole of alkali-metal borohydride per four moles of said impurity present in said crude aromatic polycarboxylic acid, carbon treating said borohydride treated solution, acidifying said carbon treated solution to regenerate said aromatic polycarboxylic acid, and recovering purified acid.

2. The method of claim 1 wherein said crude acid is treated with said alkali-metal borohydride at a temperature of less than 100° C.

3. The method of claim 1 wherein the temperature is in the range of 20° C.–30° C.

4. The method of claim 1 wherein the mole ratio of said alkali-metal borohydride to said impurity is 1:2.

5. The method of claim 1 wherein the alkali-metal borohydride is sodium borohydride.

References Cited

UNITED STATES PATENTS 3,247,246   4/1966   Fragen _____ 260—525

BERNARD HELFIN, *Primary Examiner.*

U.S. Cl. X.R.

260—75